(12) United States Patent
McCrary et al.

(10) Patent No.: US 7,130,521 B2
(45) Date of Patent: Oct. 31, 2006

(54) CABLE GUIDE

(75) Inventors: Terry McCrary, Pinckneyville, IL (US); Brad Noward, Pinckneyville, IL (US); Don Ohms, Sparta, IL (US); Tony Lookabill, Hickory, NC (US)

(73) Assignee: GS Metals Corp., Pinckneyville, IL (US)

( * ) Notice: Subject to any disclaimer, the term of this patent is extended or adjusted under 35 U.S.C. 154(b) by 0 days.

(21) Appl. No.: 10/922,727

(22) Filed: Aug. 20, 2004

(65) Prior Publication Data

US 2006/0039667 A1    Feb. 23, 2006

(51) Int. Cl.
  *G02B 6/00*    (2006.01)
  *B66D 3/04*    (2006.01)
(52) U.S. Cl. .................... 385/136; 254/390
(58) Field of Classification Search ........ 385/134–137; 254/389–390, 413–415, 134–3 R
  See application file for complete search history.

(56) References Cited

U.S. PATENT DOCUMENTS

| | | | |
|---|---|---|---|
| 2,618,465 A | 11/1952 | Austin, Jr. | |
| 2,846,189 A | 8/1958 | MacLaughlin | |
| 3,081,978 A | 3/1963 | Kaufmann | |
| 3,222,030 A | 12/1965 | Thorpe | |
| 3,493,032 A | 2/1970 | Brown, Jr. et al. | |
| 3,829,065 A | 8/1974 | Less | |
| 3,984,732 A | 10/1976 | Podrecca | |
| 4,325,537 A | 4/1982 | Winter et al. | |
| 5,809,733 A | 9/1998 | Venegas, Jr. | |
| 6,076,315 A | 6/2000 | Kondo | |
| 6,109,561 A * | 8/2000 | Haines | 242/615.2 |
| 6,256,939 B1 | 7/2001 | Snyder | |
| 6,719,243 B1 | 4/2004 | Haverty | |
| 6,729,606 B1 * | 5/2004 | Durin | 254/395 |

* cited by examiner

*Primary Examiner*—Michelle Connelly-Cushwa
*Assistant Examiner*—Chris Chu
(74) *Attorney, Agent, or Firm*—DLA Piper Rudnick Gray Cary US LLP; R. Blake Johnston

(57) ABSTRACT

A cable guide for a cable support system that includes at least one support tray. The cable guide has a base with two base portions disposed in side by side relation. The base portions are adapted to cooperatively engage wires of the support tray(s). A support shaft extends from at least one of the base portions, and a roller is rotatably mounted on the support shaft and engage cables so that they may be turned along a path defined by the cable trays.

18 Claims, 6 Drawing Sheets

CABLE GUIDE

TECHNICAL FIELD OF THE INVENTION

The invention relates generally to cable tray systems, and more particularly to cable guides mounted on cable support trays.

BACKGROUND OF THE INVENTION

Cable support systems featuring trays are known for supporting a network of cables below raised floors or above hung ceilings and in other areas where cable networks are located. The conventional cable tray system is made up of a large number of trays positioned end to end along a desired route where cables are to placed and supported. The cable trays, in turn, are supported by a number of brackets or hangers mounted on support shafts (such as sub-floor support shafts holding up a raised floor), walls, ceilings, floors or other building structures. The trays are connected to each other by clips or clamps.

Corners or turns along the cable route or pathway defined by the cable trays make installation of cables difficult. More specifically, a cable must be carefully guided by hand around corners and turns during installation as there is a risk of snapping or damaging the cable against the sides or edges of the mesh trays that form the corner of the turn or surrounding support brackets or hangers. The cables may also become tangled if not kept aligned with the route of the trays. In addition, many of the low voltage cables installed in the cable trays have specific bend radius requirements (3× and 10× bend radius versus the cable diameter). In this case, the requirement is to avoid a 90 degree corner.

In response to this issue, cable guide devices exist for maintaining cable alignment with the trays at turns in the tray route. An example of a guide device is presented in U.S. Pat. No. 6,729,606 to Durin. The device of the Durin '606 patent includes special brackets and separate clamping plates and fasteners to attach a set of rollers to the trays. As a result, the device of the Durin '606 patent is cumbersome to attach to trays and the attachment procedure requires tools. In addition, the multiple rollers consume space and add to the complexity and cost of the device. The rollers are limited to a single size which also limits the flexibility of the device.

Accordingly, it is an object of the present invention to provide a cable guide that is easy to install on a cable tray without the use of tools.

It is another object of the present invention to provide a cable guide that is durable.

It is another object of the present invention to provide a cable guide that is economical to manufacture.

It is still another object of the present invention to provide a cable guide that offers adjustable roller size.

These and other objects and advantages will be apparent from the following specification.

SUMMARY OF THE INVENTION

In the present invention, a cable guide is provided that is easily mounted on the support trays of a cable support system. The cable guide has a base with at least two base portions disposed in side by side relation. The base portions are adapted to cooperatively engage parallel wires of a support tray. A support shaft extends from at least one of the base portions and a roller is rotatably mounted on the support shaft and engages cables as they are turned along a path defined by the trays of the cable support system. The base and support shaft are assembled from two sections that feature mating surfaces. The mating surfaces are provided with protrusions and recesses that engage to secure the sections together.

The cable guide has a plurality of rollers each with a different height. Each roller is interchangeably mountable on the support shaft for engaging cables. The support shaft features a number of spaced holes and a locking pin for securing any one of the interchangeable rollers on the support shaft. The cable guide roller may be formed from upper and lower flange portions rotatably mounted on the support shaft. Or a cylinder rotatably mounted on the support shaft may be placed between the two flange portions.

The following detailed description of embodiments of the invention, taken in conjunction with the appended claims and accompanying drawings, provide a more complete understanding of the nature and scope of the invention.

DESCRIPTION OF THE PREFERRED EMBODIMENTS

Figure 1:
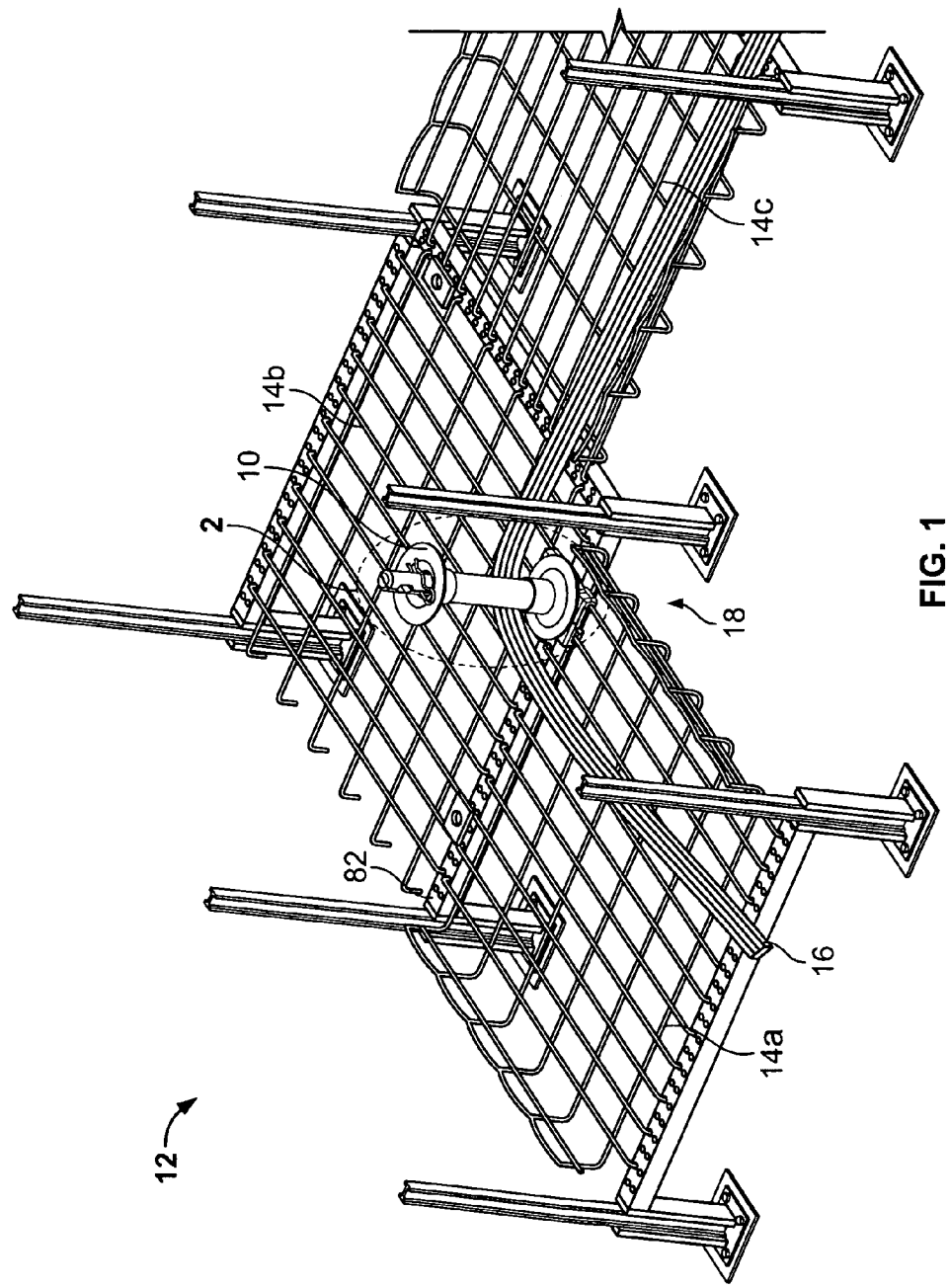
FIG. 1 is a perspective view of a cable tray system equipped with an embodiment of the cable guide of the present invention.

A cable support system, indicated in general at 12 in FIG. 1, has a number of wire-mesh support trays 14*a*–*c* connected to each other and defining a route for, and supporting, at least one cable 16 along the route. An embodiment of the cable guide of the present invention is indicated at 10 and is mounted on trays 14*a* and 14*b* to guide cable 16 through a turn 18 along the route as well as out of contact with the tray sides or edges at turn 18. This prevents any damage or tangling of the cable at the turn 18 when the cables are being installed or adjusted or along the route.

Figure 2:
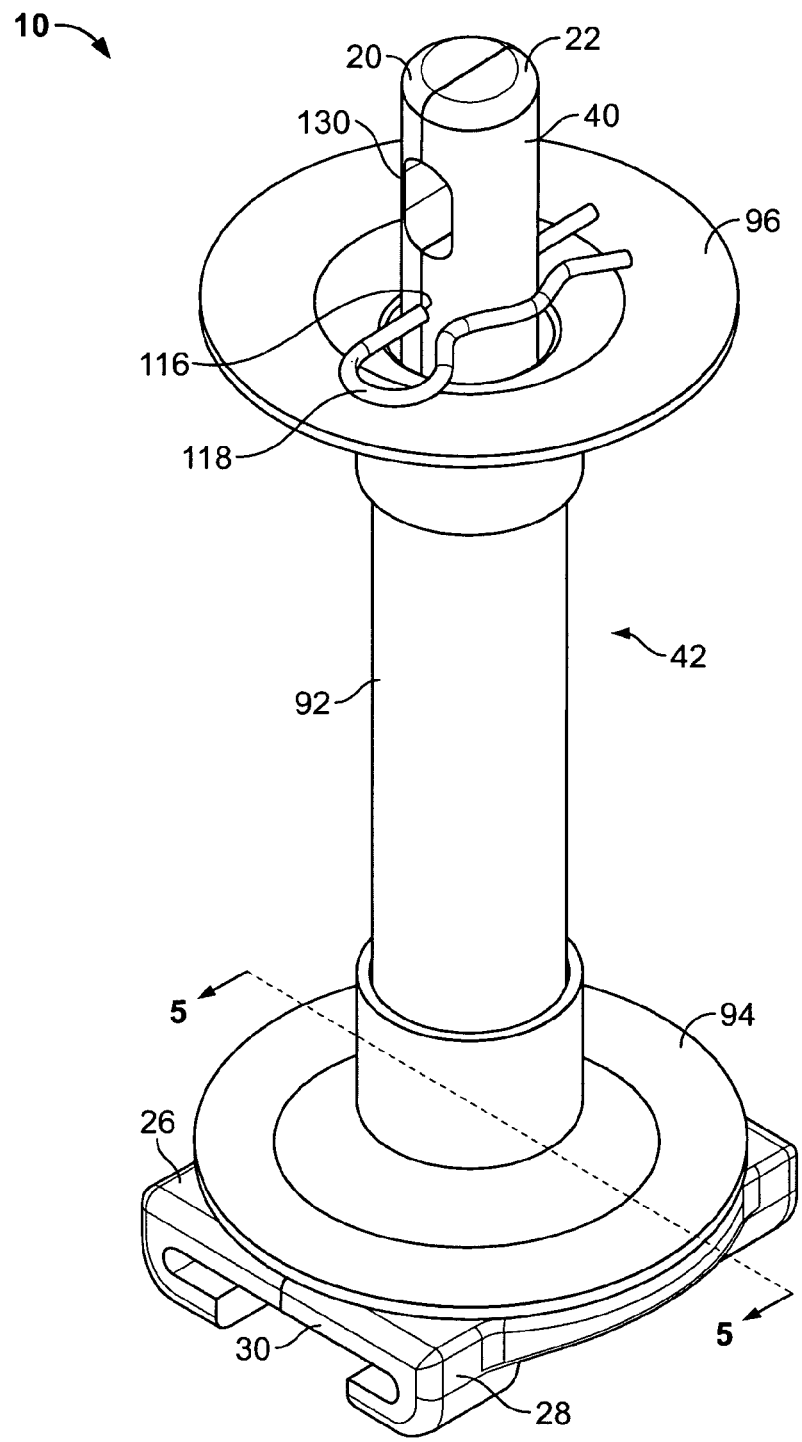
FIG. 2 is an enlarged perspective view of the cable guide of FIG. 1.
Figure 3:
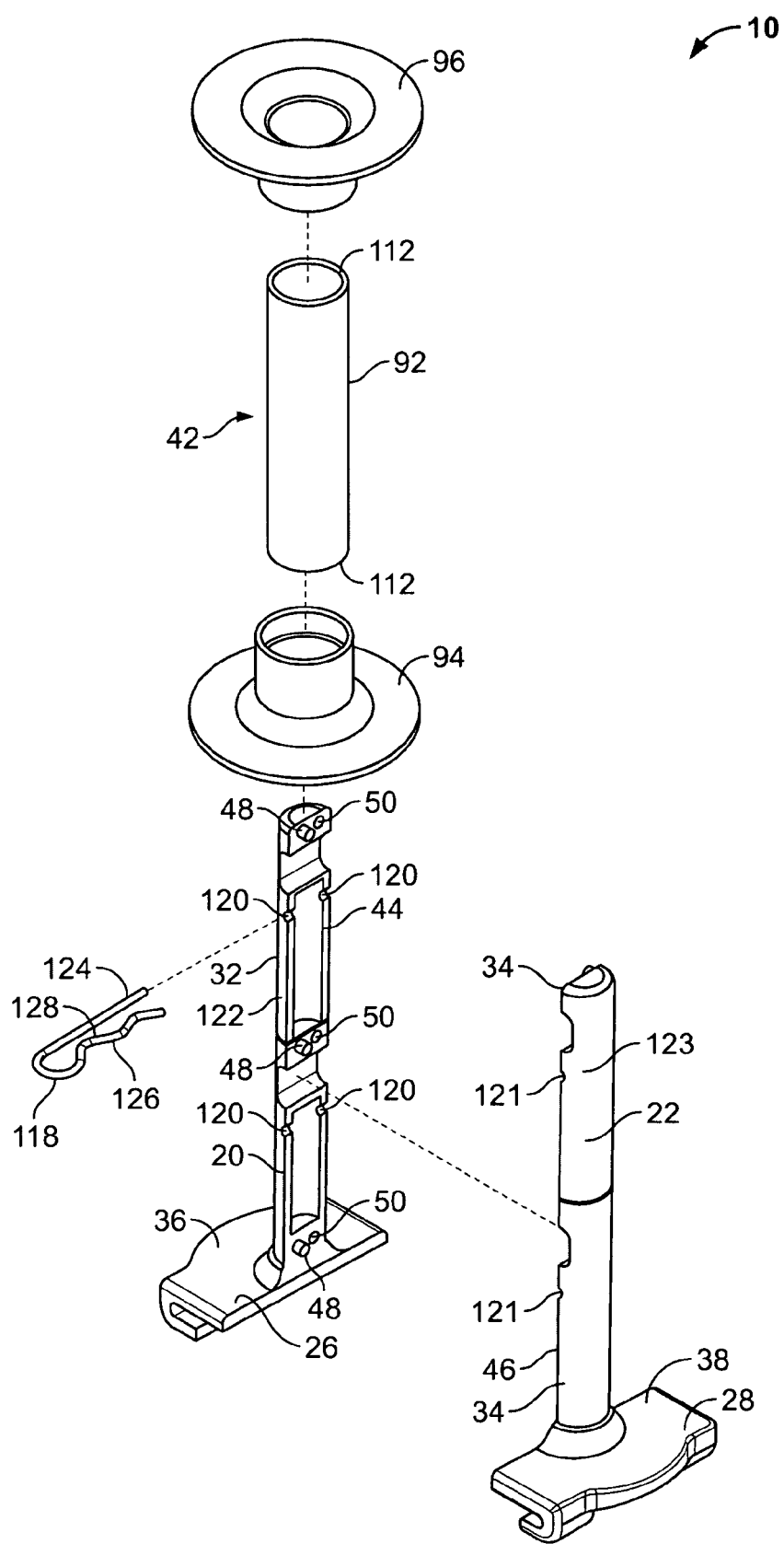
FIG. 3 is an exploded view of the cable guide of FIG. 2.
Figure 4:
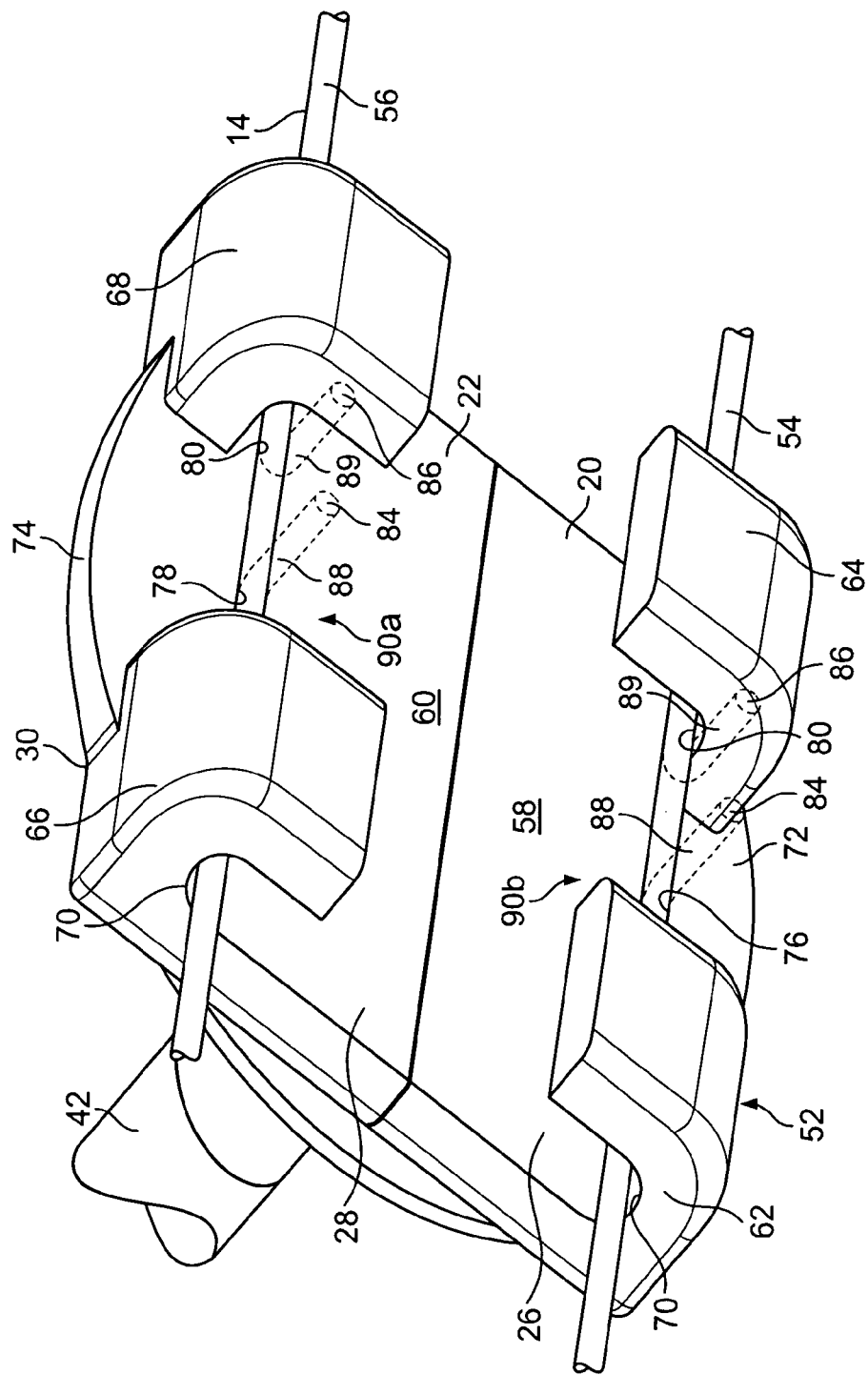
FIG. 4 is a perspective view of the lower portion of the cable guide of FIG. 2 illustrating how it engages the wires of a cable tray.

As shown in FIGS. 2–4, the cable guide 10 is made of two generally identical mating first and second sections or halves 20, 22. The two sections 20, 22 each have a base portion 26, 28 that cooperatively form a base 30 when secured together in side-by-side relation, as illustrated in FIGS. 2 and 4.

As illustrated in FIG. 3, extensions 32, 34 extend upward from a top surface 36, 38 of each base portion 26, 28. The extensions 32, 34 also connect to each other and cooperatively form a support shaft or post 40 (FIG. 2). In the illustrated embodiment, the extensions 32, 34 are approximately identical and each form approximately one-half of the support shaft 40. A roller, indicated in general at 42 in FIGS. 2 and 3, is rotatably mounted on the support shaft 40.

As illustrated in FIG. 3, first and second sections 20, 22 have mating surfaces 44, 46, both with protrusions 48 extending therefrom and recesses 50 formed therein. While only mating surface 44 is shown on FIG. 3, mating surface 46 is identical. In the illustrated embodiment, each mating surface 44, 46 has three pairs of connections where a protrusion 48 engages a corresponding recess 50 on the opposite mating surface. The protrusions 48 and recesses 50 are sized (or designed with tolerances) to form a very tight or snug fit with one another so that the first and second sections 20, 22 are fixed to each other without any other securing devices.

It will be appreciated that more or less connectors 48, 50 could be used in locations different from those illustrated in FIG. 3. In an alternative embodiment, one of sections 20 or 22 may have all protrusions 48 while the opposite section 22 or 20 may have all recesses 50. It will also be appreciated that instead of, or in addition to, the protrusion and recess connections, the inner diameter of the roller 42 can be dimensioned to hold the shaft 40 together. Alternatively, other connections and fasteners such as screws, clips or clamps could be used to secure the first section to the second section.

Referring to FIG. 4, the base portions 20, 22 are disposed in side by side relation in order to cooperatively engage at least one support tray 14. More specifically, the base portions 20, 22 cooperatively form a claw-like structure, indicated in general at 52, for gripping a gripable portion of the support tray 14. In the illustrated embodiment, the gripable portion is at least two opposing wires 54, 56 spaced from each other on the support tray 14.

As illustrated in FIG. 4, each base portion 20, 22 has a bottom end 58, 60 with hooks 62, 64, 66 and 68 extending below. Each base portion respectively has an outer side 72, 74. Two of the hooks 62 and 64, or 66 and 68, are respectively spaced along the outer sides 72, 74 to form the structure 52. As a result, each hook defines a groove 70 configured for engaging one of the wires 54 or 56 of the support tray 14. The hooks 62–68 are aligned with the wires 54, 56 when the cable guide is assembled so that mating the base portions 26, 28 on the support tray 14 traps the wires within the grooves 70 in order to secure the cable guide 10 to the support tray.

Each side 72, 74 has a lip 76 or 78 extending between each pair of spaced hooks (62 and 64) or (66 and 68). The lips 76, 78 are aligned with the grooves 70 and provide an engaging surface 80 for receiving the wire 54 or 56. Thus, each wire 54 or 56 is trapped within the corresponding two hooks 62 and 64 (or 66 and 68) and against a corresponding engaging surface 80 on each base portion 20, 22 when the cable guide 10 is assembled.

In the embodiment shown on FIG. 1, the cable guide 10 straddles a joint 82 between two adjacent support trays 14a and 14b. In this case, each base portion 20, 22 receives an aligned pair of wire ends 84, 86 (shown in phantom in FIG. 4). The wire ends 84, 86 have down-turned portions 88, 89 extending through the open spaces 90a, 90b between the two hooks on each base portion 26, 28. With this configuration, each hook 62, 64, 66, 68 engages a separate wire.

The roller 42 may be configured with a number of alternative heights via a plurality of interchangeable components that can be mounted on the support shaft 40. For example, in the configuration shown in FIGS. 2–3, in one configuration, roller 42 includes a cylinder 92 rotatably mounted on the support shaft 40 to engage the cables. The cylinder 92 is placed between two flange portions 94, 96, which are also rotatably mounted on the support shaft 40.

Figure 5:
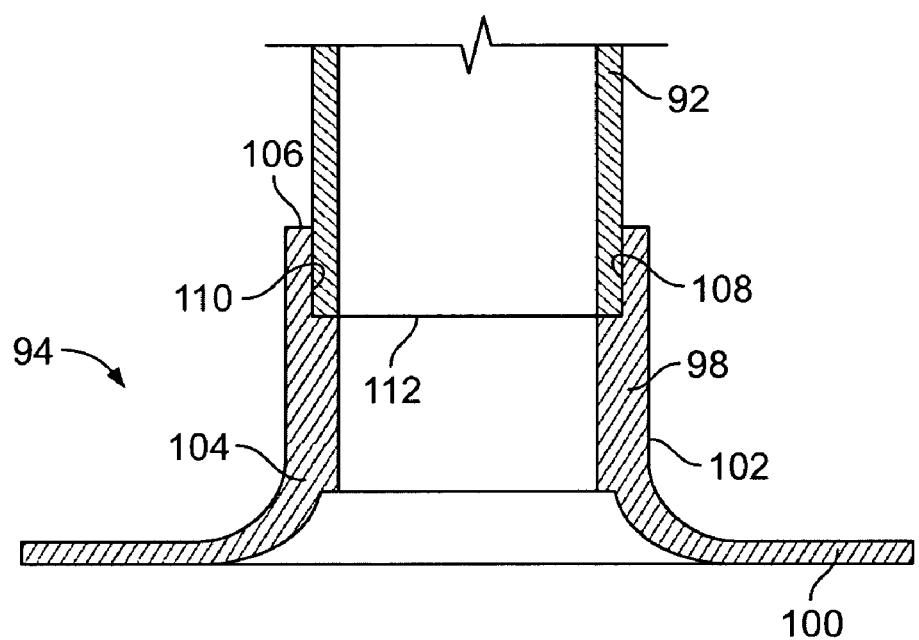
FIG. 5 is a cross-sectional view of the bottom flange and a lower portion of the roller of the cable guide taken along line 6—6 of FIG. 2.
Figure 6:
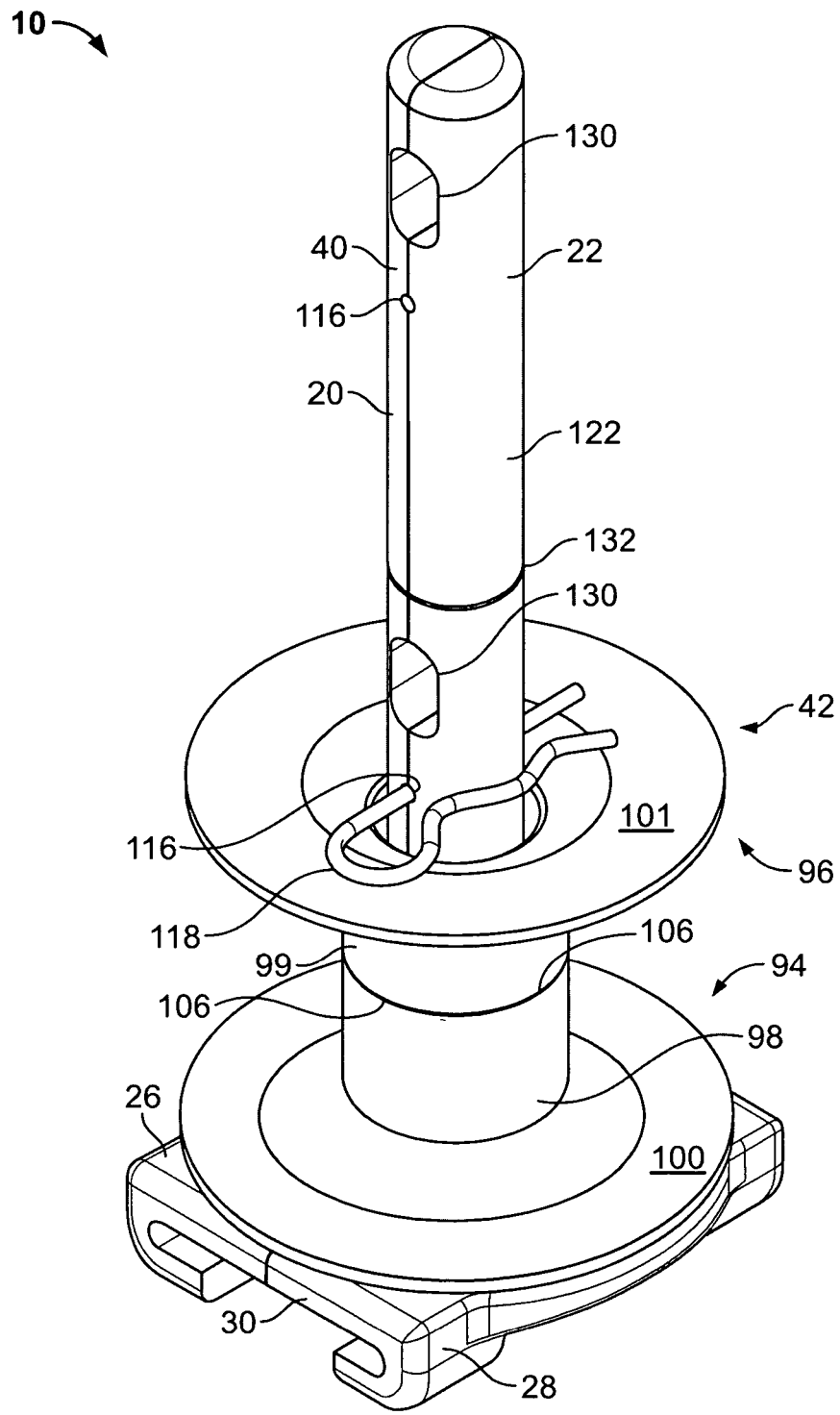
FIG. 6 is a perspective view of the cable guide of FIG. 2 with the roller in an alternative configuration in accordance with the present invention.

As shown in FIG. 5, the flange portion, indicated in general at 94, has a tubular portion 98 and a disc portion 100 radially extending therefrom. The disc 100 is integrally formed with the tubular portion 98 but it will be understood that the disc may be a separate piece engaging the exterior wall 102 of the tubular part 98. The disc 100 extends from an end 104 of the tubular portion 98 while the opposite end 106 of the tubular portion has an interior wall 108 with an increased inner diameter for forming an interior shoulder 110 that engages an end 112 of the cylinder 92. Flange 96 of FIGS. 2, 3 and 6 is identical in construction to flange 94. As illustrated in FIGS. 2 and 3, the flange portions 94, 96 are mounted on the support shaft 40 and on opposite ends of the cylinder 92 so that the discs 100 and 101 are formed at the far ends of the roller 42 to prevent cables from being pulled vertically or axially (parallel to the longitudinal axis of support shaft 40) off of the roller 42.

In an alternative embodiment shown in FIG. 6, the cylinder 92 of FIGS. 2 and 3 has been omitted from roller 42. As a result, the ends 106 of the flange portions 94, 96 abut each other on the support shaft 40 so as to form roller 42. With the flange portions 94, 96 disposed end-to-end on the support shaft 40, the tubular portions 98 and 99 are positioned to engage cables while the discs 100 and 101 are positioned on the far ends of the roller 42 to prevent the cable from moving axially off of the roller.

While only two alternative configurations of the roller of the cable guide of the present invention are shown, it is to be understood that the roller 42 can have many different configurations. These include, but are not limited to, a cylinder by itself, a cylinder with one or more discs or flanges attached to the cylinder (such as at the bottom and/or the top or along its length, to divide spaces for multiple cables). The discs may be either attached to or integrally formed with the cylinder. For example, the cylinder could feature two integrally formed discs, one at each end, forming the complete roller. Thus, it will be appreciated that the roller 42 can be any combination of cylinders, discs, and/or flange portions.

As shown on FIGS. 2–3 and 6, the support shaft 40 includes a number of locking pin holes 116 for receiving a locking clip or pin 118 at a height on the support shaft 40 that locks the roller 42 on the support shaft between the locking pin 118 and the base 30. With this configuration, the roller 42 has very little room to move axially on the support shaft 40. As illustrated in FIG. 3, each hole 116 is cooperatively formed by two corresponding grooves 120 and 121 on the mating surfaces 44, 46 of the first and second sections 20, 22. More specifically, the support shaft 40 is hollowed out and the grooves 120 and 121 are placed at diametrically opposing positions on the sidewalls 122 and 123 of the support shaft 40. Thus, the grooves form a single locking through hole 116. It will be appreciated, however, that support shaft 40 can be solid and provided with a continuous through hole. It will also be appreciated that the through hole could be formed at a different angle on the support shaft 40 rather than perpendicular to the mating surfaces 44, 46 of the first and second sections 20, 22.

Each hole 116 corresponds to the height of a particular roller selection. Thus, the roller 42 could be configured with cylinders or flange portions of different heights that can be locked on the support shaft 40 with locking pin 118.

The locking pin 118 is generally U-shaped and made of a resilient material that biases the two arms of the pin (124, 126 in FIG. 3) toward each other. The arm 124 that extends on the exterior of the support shaft 40 has a bend 128 forming an indent that receives the curved sidewall 122 or 123 of the support shaft 40. When pushing the straight arm 124 of the pin 118 into locking hole 120, the exterior arm 126 of the pin snaps into place when the bend 128 receives the curved sidewall 122 or 123 in its indent thereby locking the pin 118 in place. The roller 42 cannot be removed from the support shaft 40 without first removing the pin 120.

It will be appreciated that instead of pin locking holes 120 and pin(s) 118, the locking mechanism can be any other fastener, connection or stopper that can attach to support shaft 40 and is strong enough to resist the axial movement of roller 42. This may include screws, bolts or fasteners placed through holes in support shaft 40 or clamps, rings or anything else that attaches to the exterior of support shaft 40 and can engage the end(s) of roller 42.

As an alternative to the two-piece base illustrated in FIGS. 2–4 and 6, the cable guide of the present invention, including the support shaft that may be equipped with rollers of different heights and configurations, could be provided with a one-piece base without hooks. In such an embodiment, the base is secured to the wires of the cable trays via clips or one or more plates that are secured to the bottom of the base, with cable tray wires trapped there between, via screws or the like. Other base fastening arrangements could also be used, including the one illustrated in U.S. Pat. No. 6,729,606 to Durin.

As illustrated in FIGS. 2 and 6, an aperture 130 is also cooperatively formed by the first and second sections 20, 22 to facilitate the installation of cables. More specifically, aperture 130 receives a return pull cord that has a first end tied to a cable or group of cables to be installed on the cable support system 12 (FIG. 1). The second end of the pull cord is threaded through the apertures 130 of the cable guides of the system in a direction back towards the installer, and in a direction opposite the direction in which the cables are to be pulled. As a result, the return pull cord loops back to the installer so that he may pull the cord which results in the cables being pulled through the trays of the cable support system and around the cable guides of the system so that they are properly positioned and installed.

The cable guide is made of metal, hard plastic or any other material rigid enough to withstand the forces generated by the roller when engaged by cables. An optional scoring, illustrated at 132 in FIG. 6, is located on the sidewall 122 of the support shaft to provide a place to cut the support shaft to change the length or height of the support shaft if desired.

While the preferred embodiments of the invention have been shown and described, it will be apparent to those skilled in the art that changes and modifications may be made therein without departing from the spirit of the invention, the scope of which is defined by the appended claims.

What is claimed is:

1. A cable guide for a cable support system including at least one support tray, the cable guide comprising:
    a base having at least two base portions disposed in side by side relation, the support tray(s) having a gripable portion, and said base portions cooperatively forming a claw-like structure for gripping said gripable portion;
    a support shaft extending from at least one of said base portions so as to have a free-standing distal end; and
    a roller rotatably mounted on said support shaft and adapted to engage a cable.

2. The cable guide of claim 1, wherein said gripable portion of the support tray(s) is at least two opposing wires spaced from each other, and
    wherein each said base portion has a bottom end and at least one hook extending below said bottom end, each said hook defining a groove configured for engaging one of the wires of the support tray(s), said hooks being aligned with the wires when said cable guide is assembled so that mating said base portions on the support tray traps the wires within said grooves on said hooks, whereby said cable guide is mounted on said support tray.

3. The cable guide of claim 1, further comprising means for locking said roller on said support shaft.

4. A cable guide for a cable support system including at least one support tray, the cable guide comprising:
    a base having at least two base portions disposed in side by side relation, said base portions adapted to cooperatively engage the support tray(s);
    a support shaft extending from at least one of said base portions;
    a roller rotatably mounted on said support shaft and adapted to engage a cable; and
    a first section and a second section mating with said first section, each said base portion being formed by one of said sections and wherein said support shaft is formed by at least one of said first and second sections.

5. The cable guide of claim 4, wherein said first and second sections both include an extension from their respective base portions, said extensions cooperatively forming said support shaft.

6. A cable guide for a cable support system including at least one support tray, the cable guide comprising:
    a base having at least two base portions disposed in side by side relation, said base portions adapted to cooperatively engage the support tray(s);
    a support shaft extending from at least one of said base portions so as to have a free-standing distal end; and
    a roller rotatably mounted on said support shaft and adapted to engage a cable, wherein said roller includes a cylinder rotatably mounted on said support shaft for engaging the cable.

7. The cable guide of claim 6, wherein said cylinder has opposing ends, and wherein said roller includes two flange portions mounted on said support shaft, one flange portion being disposed at each end of said cylinder, said flange portions each including a radially extending disc.

8. The cable guide of claim 7, wherein each flange portion has a tubular part extending along said support shaft and an end mating with said cylinder, each said disc extending from a respective said tubular portion.

9. A cable guide for a cable support system including at least one support tray, the cable guide comprising:
    a base having at least two base portions disposed in side by side relation, said base portions adapted to cooperatively engage the support tray(s);
    a support shaft extending from at least one of said base portions so as to have a free-standing distal end; and
    a roller rotatably mounted on said support shaft and adapted to engage a cable, wherein said roller includes at least one flange portion having a tubular part rotatably mounted on said support shaft and at least one disc extending radially from said tubular part.

10. The cable guide of claim 9, wherein said roller includes two flange portions mounted on said support shaft in a symmetrical arrangement so that said tubular parts abut each other and are disposed for engaging said cable.

11. The cable guide of claim 9, wherein said support shaft and said base portions comprise first and second mating sections with each having an opposing mating surface, said mating surfaces having protrusions and recesses that engage to secure said first and second sections together.

12. The cable guide of claim 11, wherein the mating surfaces of said first and second mating sections each have a corresponding pin groove, said pin grooves cooperatively forming a locking pin hole when said mating surfaces are disposed against each other.

13. The cable guide of claim 11, wherein said first and second mating sections cooperatively form an aperture for receiving a cable pull cord.

14. A cable guide for a cable support system including at least one support tray, the cable guide comprising:
- a base having at least two base portions disposed in side by side relation, said base portions adapted to cooperatively engage the support tray(s);
- a support shaft extending from at least one of said base portions so as to have a free-standing distal end;
- a roller rotatably mounted on said support shaft and adapted to engage a cable; and
- said support shaft including at least one locking pin hole for receiving a locking pin that locks said roller on said support shaft.

15. The cable guide of claim 14, wherein said support shaft includes multiple said locking pin holes spaced along said support shaft, each hole corresponding to at least one roller of a plurality of rollers each with a different height, wherein said locking pin is disposed within a selected hole that corresponds to a selected roller mounted on said support shaft for locking said selected roller on said support shaft.

16. A cable guide for a cable support system including at least one support tray, the cable guide comprising:
- a base adapted to be attached to the support tray(s);
- a support shaft extending from said base so as to have a free-standing distal end;
- a plurality of rollers each with a different height, each roller being interchangeably mountable on said support shaft for engaging a cable running against said guide roller; and
- means for securing any one of the interchangeable rollers on said support shaft.

17. The cable guide of claim 16, wherein said means for securing includes a plurality of locking pin holes spaced along said support shaft for selectively receiving a locking pin.

18. The cable guide of claim 16, wherein said roller includes at least one selected from the group consisting of:
- (a) a cylinder,
- (b) a flange portion having a tubular portion and an integrally formed disc radially extending from said tubular portion,
- (c) said cylinder between at least two said flange portions,
- (d) only one said flange portion,
- (e) only two said flange portions, and
- (f) one of said cylinder and one of said flange portions.

* * * * *